(12) United States Patent
Watanabe

(10) Patent No.: US 6,894,971 B2
(45) Date of Patent: May 17, 2005

(54) REDUNDANT STRUCTURE CONTROL DEVICE FOR EXCHANGE

(75) Inventor: Yoshihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 668 days.

(21) Appl. No.: 09/726,990

(22) Filed: Nov. 30, 2000

(65) Prior Publication Data

US 2001/0012267 A1 Aug. 9, 2001

(30) Foreign Application Priority Data

Feb. 3, 2000 (JP) ........................................ 2000-026108

(51) Int. Cl.[7] .................... G01R 31/08; G06F 11/00; H04J 1/16; H04J 3/14; H04L 1/00
(52) U.S. Cl. ...................... 370/228; 340/825.01; 714/4
(58) Field of Search ................... 370/389, 392, 370/228, 218, 217, 225, 395.1, 397, 398, 399, 409, 216, 219, 220, 227, 229, 396, 242, 248, 360, 422, 471, 253, 230; 340/825.01; 714/4

(56) References Cited

U.S. PATENT DOCUMENTS

| | | | | |
|---|---|---|---|---|
| 5,715,237 A | * | 2/1998 | Akiyoshi ..................... | 370/228 |
| 6,028,861 A | * | 2/2000 | Soirinsuo et al. ........... | 370/225 |
| 6,147,972 A | * | 11/2000 | Onishi et al. ................ | 370/248 |
| 6,246,665 B1 | * | 6/2001 | Watanabe et al. ........... | 370/218 |
| 6,292,485 B1 | * | 9/2001 | Trotta et al. ................ | 370/389 |
| 6,333,932 B1 | * | 12/2001 | Kobayasi et al. ........... | 370/389 |
| 6,359,859 B1 | * | 3/2002 | Brolin et al. ................ | 370/218 |

FOREIGN PATENT DOCUMENTS

| | | |
|---|---|---|
| JP | 09238118 | 9/1997 |
| JP | 11027286 | 1/1999 |

* cited by examiner

*Primary Examiner*—Wellington Chin
*Assistant Examiner*—Jamal A. Fox
(74) *Attorney, Agent, or Firm*—Katten Muchin Zavis Roseman

(57) ABSTRACT

A redundant structure control device for an (N+1) reluctant structure exchange, capable dealing with line trouble and line interface device trouble. When line trouble is detected frame tag attaching is arranged so a frame coming from a interface device originally connected with a troubled line toward die troubled line may be sent to a spare line. When a troubled line interface device is detected, frame tag attaching is arranged so that a frame coming from a line originally connected with the troubled line interface device be sent to a spare line interface device and a frame earning from the spare line interface device may flow so the line originally connected with the troubled line interface device, and instructs the change of a cell tag coming from an ATM switch toward the troubled line interface device, to a value indicating that the cell be sent to the spare line interface device.

3 Claims, 9 Drawing Sheets

REDUNDANT STRUCTURE CONTROL DEVICE FOR EXCHANGE

BACKGROUND OF THE INVENTION (1) Field of the Invention

The present invention relates to a redundant structure control device for an exchange, particularly to a redundant structure control device for an exchange, capable of separately dealing with trouble that has happened at any of lines and trouble that has happened at any of line interface devices which terminates the lines, in an ATM (Asynchoronous Transmission Mode) exchange having a redundant structure of lines and line interface devices.

(2) Description of the Related Art

Conventionally, an ATM exchange has a redundant structure of lines and line interface devices wherein the ratio of lines and line interface devices for current use to spare lines and line interface devices is 1:1. When any of lines and line interface devices for current use becomes unavailable due to trouble or something, switching to a spare line or spare line interface device is performed so that the service can be continued without interruption.

Recently, in view of cost, instead of the redundant structure wherein lines and line interface devices are provided completely doubly, that is, as many spare systems as systems for current use are provided, a redundant structure has been proposed wherein a single spare system is provided to N systems for current use so that when trouble happens at any of the lines and line interface devices of the systems for current use, switching from the system at which trouble has happened to the single spare system may be performed.

Japanese Patent Preliminary Publication Hei 9-238118 discloses switching control performed when trouble has happened. According to the disclosure, a line switching device for switching from the line and line interface device of one of N systems for current use to the line and line interface device of a single spare system is provided not as a spatial switch but as a time switch so that the line switching device may not be complicated even with an increased number of channels.

Japanese Patent Preliminary Publication Hei 11-27286 discloses another way of dealing with trouble. According to the disclosure, at least one spare device for a spare line is provided in advance, and a by-pass route is set up between the spare device and each device for current use. (When a plurality of spare lines are provided, a plurality of spare systems are connected in a row with a by-pass route.) When trouble happens at a line for current use, switching to the by-pass route set up in advance is performed so that cells may be sent out through the spare line.

In any of the conventional ATM exchanges, a line and a line interface device that holds the line are integrated. Therefore, when trouble happens at either a line or a line interface device of a system for current use, switching to the line and line interface device of the spare system is performed.

In the (N+1) redundant structure, when trouble happens at either a line or a line interface device, both the line and the line interface device of the spare system are used. Therefore, for example, when trouble happens at a line, therefore, switching to the line and line interface device of the spare system is performed, and then trouble happens at another line interface device, the latter trouble cannot be dealt with. This is because there remains no available spare system, though the line interface device connected with the line at which trouble has happened first is in order.

Further, in the case where a plurality of lines are held in the same line interface device, if trouble happens at the line interface device, the service stops simultaneously at those plurality of lines. In the ATM, switching is performed on a VP (virtual path) or VC (virtual channel) connection basis. Measures to perform switching on a line basis are not provided. Therefore, if trouble happens at a line interface device, the effects thereof is serious.

Further, in the ATM exchange, an output route for each cell is usually determined by a line interface device located on the input side of an ATM switch. In that case, if trouble happens at a line interface device, all the paths that include that line interface device as an output route need to be changed to include a spare system instead. However, path information is usually stored in a plurality of line interface devices located on the opposite side of the ATM switch to the side on which the line interface device at which trouble has happened is located. Therefore, usually, for all the paths that include the line interface device at which trouble has happened as an output route, path information stored in the line interface devices on the input side needs to be changed. Thus, it takes long time to change all the paths that have connections at the line interface device at which trouble has happened. For example, when 8000 connections are held in the line interface device at which trouble has happened and it takes 10 milliseconds to rewrite path information for one path, it takes 80 seconds to change all the paths. This causes a large decrease in performance of line service.

SUMMARY OF THE INVENTION

The present invention has been made in view of the above problems. An object of the present invention is to provide a redundant structure control device for an exchange capable of separately dealing with trouble that has happened at any of lines and trouble that has happened at any of line interface devices in an ATM exchange having an (N+1) redundant structure.

In order to attain the above object, a redundant structure control device for an exchange having a spare line interface device is provided. The redundant structure control device for an exchange comprises frame tag attaching means for attaching a routing header to a frame coming in from lines or line interface devices and giving tag information in the routing header; frame switching means for switching a destination of the frame to which tag information has been given, in accordance with the tag information; and routing control means for monitoring states of the line interface devices, and when trouble happens at one of the line interface devices, sending out a control signal to the frame tag attaching means so that a frame coming from a line originally connected with the line interface device at which trouble has happened may be switched over to the spare line interface device, and arranging the frame tag attaching means so that a frame coming from the spare line interface device may flow to the line originally connected with the line interface device at which trouble has happened.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, with reference to the drawings, the outline of the present invention will be described.

Figure 1:
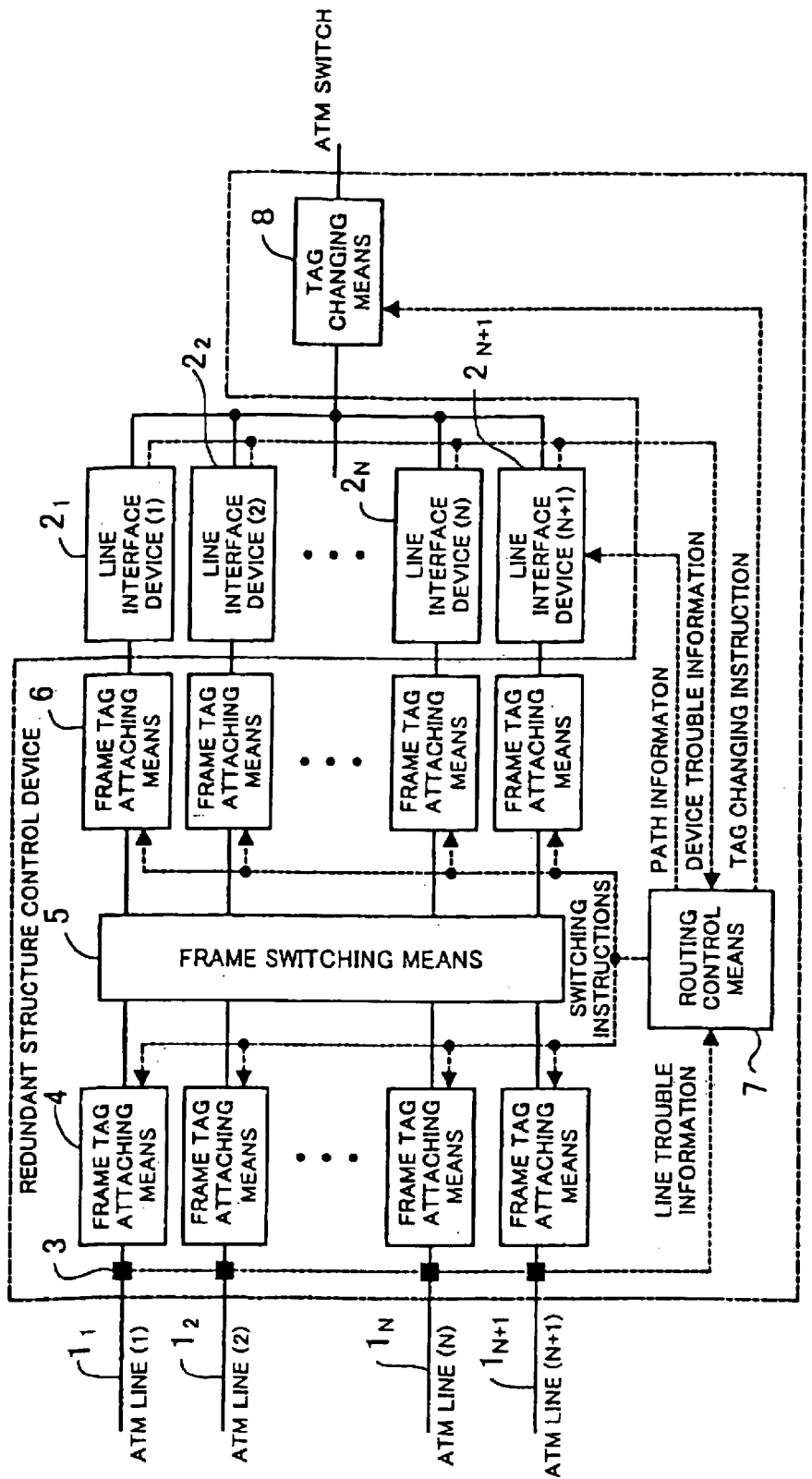
FIG. 1 is a block diagram showing an example of fundamental structure of a redundant structure control device for an exchange according to the present invention.

FIG. 1 is a block diagram showing an example of fundamental structure of a redundant structure control device for an exchange according to the present invention. According to FIG. 1, in addition to a basic redundant structure comprising N sets of an ATM line $1_1 \sim 1_N$ and a line interface device $2_1 \sim 2_N$ for current use and one set of a spare ATM line $1_{N+1}$ and a spare line interface device $2_{N+1}$, a redundant structure control device of the present invention is provided. The redundant structure control device includes (N+1) line trouble monitoring means 3, (N+1) first frame tag attaching means 4, a frame switching means 5, (N+1) second frame tag attaching means 6, a routing control means 7 and a tag changing means 8.

The line trouble monitoring means 3 are provided between the ATM lines $1_1 \sim 1_{N+1}$ and the first frame tag attaching means 4 to monitor line trouble. If trouble happens at any of the ATM lines $1_1 \sim 1_{N+1}$, an associated line trouble monitoring means 3 puts out line trouble information.

The first and second frame tag attaching means 4 and 6 are each provided to add a routing header to an SDH (Synchronous Digital Hierarchy) or SONET (Synchronous Optical Network) frame coming from its associated ATM line $1_1 \sim 1_{n+1}$ or line interface device $2_1 \sim 2_{n+1}$, and give tag information in the added routing header. The tag attached by either of the associated first and second frame tag attaching means 4 and 6 is used only between those associated first and second frame tag attaching means 4 and 6.

The frame switching means 5 is provided to switch the destination of an SDH or SONET frame to which a tag has been attached by a first or second frame tag attaching means 4, 6 in accordance with the value of the tag.

The routing control means 7 is provided to identify, based on line trouble information from a line trouble monitoring means 3, a line interface device connected with a line at which trouble has happened, and send out switching instructions to first and second frame tag attaching means 4 and 6 so that a frame from the identified line interface device toward a line may be sent out to the spare ATM line $1_{n+1}$. Switching from the ATM line at which trouble has happened to the spare ATM line $1_{n+1}$ is performed synchronized with a counterpart ATM exchange. The routing control means 7 also monitors the state of each line interface device $2_1 \sim 2_{n+1}$. When device trouble information comes from a line interface device, the routing control means 7 sends out, based on the device trouble information, a control signal to a first frame tag attaching means 4 so that a frame coming from an ATM line originally connected with the line interface device at which trouble has happened may be switched over to a spare line interface device $2_{n+1}$, and arranges a second frame tag attaching means 6 so that a frame coming from the spare line interface device $2_{n+1}$ may flow to the line originally connected with the line interface device at which trouble has happened. Further, when trouble happens at any of line interface devices $2_1 \sim 2_N$ for current use, the routing control means 7 places, based on device trouble information, path information for those cells which are flowing toward the line interface device at which trouble has happened, in the spare line interface device $2_{N+1}$, and sends out tag changing instructions to the tag changing means 8.

The tag changing means 8 is provided to receive tag changing instructions from the routing control means 7 when trouble happens at a line interface device, and change a value of a tag of a cell indicating that the cell should be sent to the line interface device at which trouble has happened, to a value indicating that the cell should be sent to the spare line interface device $2_{N+1}$. Thus, the cell, which has come from an ATM switch, is switched over to the spare line interface device $2_{N+1}$.

With the above-described structure, when trouble happens at any of the ATM lines $1_1 \sim 1_N$, a tag indicating the spare ATM line $1_{N+1}$ is attached to a frame that is going toward the ATM line at which trouble has happened from its associated line interface device, and based on the information in the tag, the frame switching means 5 switches from the ATM line at which trouble has happened to the spare ATM line $1_{N+1}$. Switching from the ATM line at which trouble has happened to the spare ATM line $1_{N+1}$ is performed synchronized with a counterpart ATM exchange. Therefore, a frame coming from the spare ATM line $1_{N+1}$ is given a tag indicating the line interface device originally associated with the ATM line at which trouble has happened, and switched over to that line interface device by the frame switching means 5.

Further, when trouble happens at any of the line interface devices $2_1 \sim 2_N$, a tag indicating the spare line interface device $2_{N+1}$ is attached to a frame that is going toward the line interface device at which trouble has happened from its associated ATM line, and based on the information in the tag, the frame switching means 5 switches the frame coming from the ATM line originally associated with the line interface device at which trouble has happened, over to the spare ATM line interface device $2_{N+1}$. The tag of each cell that is going from the ATM switch toward the line interface device at which trouble has happened is changed by the tag changing means 8, and the cell is switched over to the spare line interface device $2_{N+1}$. Here, the spare line interface device $2_{N+1}$ has already been arranged to operate with path information for the line interface device at which trouble has happened.

Thus, in the ATM exchange having an (N+1) redundant structure, when trouble happens at either an ATM line for current use or a line interface device for current use, switching to either the spare ATM line or the spare line interface device is performed. Not both the spare ATM line and the spare line interface device are occupied at a time. Therefore, when trouble next happens at the other of the ATM line for current use and the line interface device for current use, the trouble can be dealt with and the service can be continued.

Next, embodiments of the present invention will be described taking examples in which the present invention is applied to an ATM line control component and an ATM concentrator of an ATM exchange.

Figure 2:
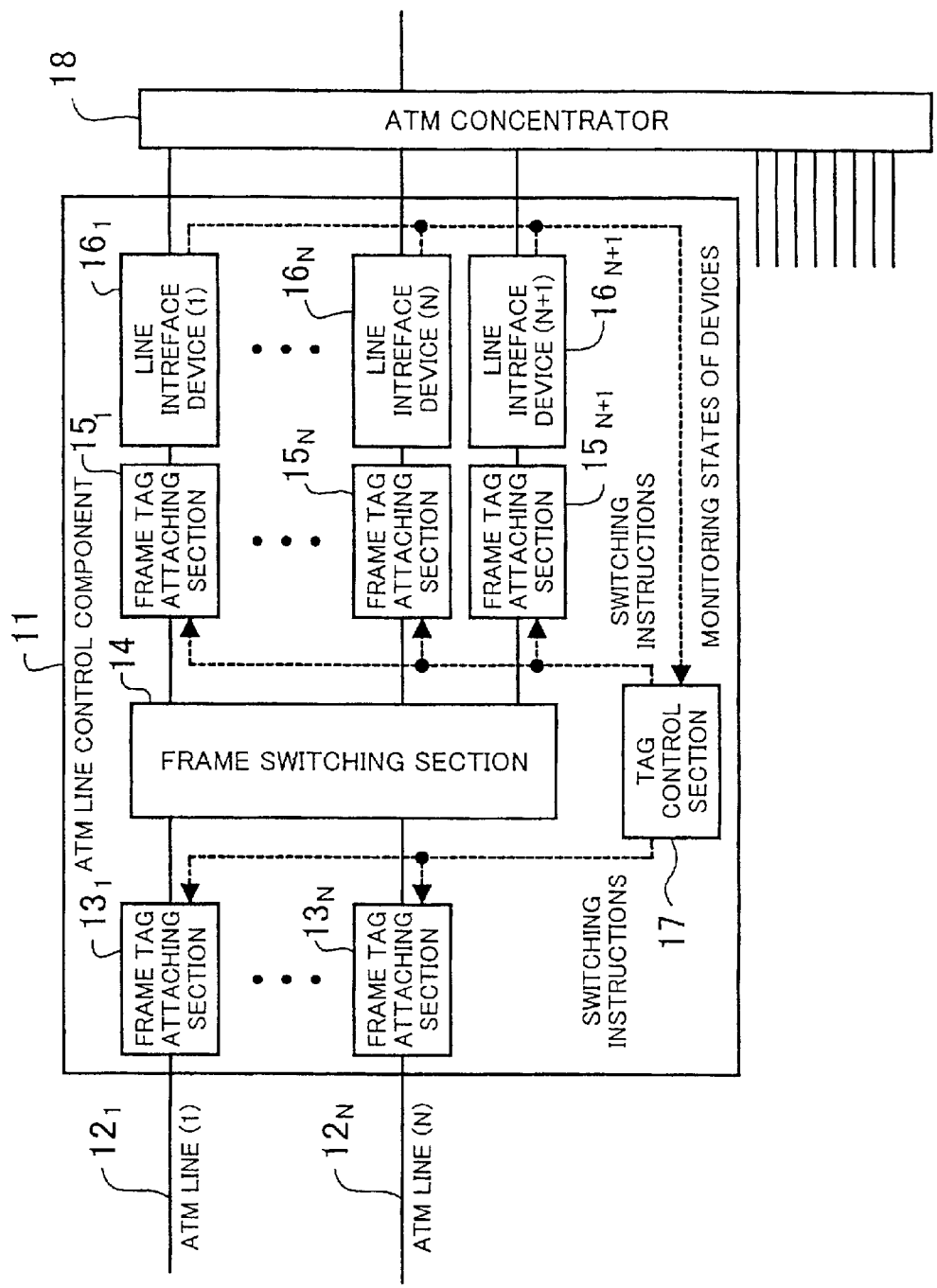
FIG. 2 is a diagram showing an example of structure of an ATM line control component having a spare line interface device.

FIG. 2 is a diagram showing an example of structure of an ATM line control component having a spare line interface device. FIG. 2 shows a structure of an ATM line control component 11 having N lines and (N+1) line interface devices. The ATM line control component 11 includes N frame tag attaching sections $13_1$~$13_N$ that terminate N ATM lines $12_1$~$12_N$ made of, for example, optical cables, a frame switching section 14 for switching a frame, (N+1) frame tag attaching sections $15_1$~$15_{N+1}$, (N+1) line interface devices $16_1$~$16_{N+1}$, and a tag control section 17. The line interface devices $16_1$~$16_{N+1}$ are connected with an ATM concentrator 18. Here, all the ATM lines $12_1$~$12_N$ are for current use, N line interface devices $16_1$~$16_N$ are for current use, and one line interface device $16_{N+1}$ is a spare device. Normally, the frame switching section 14 connects each ATM line $12_1$~$12_N$ directly with a line interface device $16_1$~$16_N$ having the same subscript.

The frame tag attaching sections $13_1$~$13_N$ and $15_1$~$15_{N+1}$ are each provided to attach tag information to an SDH or SONET frame coming in from an ATM line $12_1$~$12_N$ or a line interface device $16_1$~$16_{N+1}$. The frame switching section 14 switches the destination of an SDH or SONET frame to which a tag has been attached, based on the value of that tag. The tag control section 17 monitors the state of each line interface device $16_1$~$16_{N+1}$. When the tag control section 17 receives device trouble information, the tag control section 17 sends out switching instructions to the frame tag attaching sections $13_1$~$13_N$ and $15_1$~$15_{N+1}$ so that a tag may be attached to an SDH or SONET frame that is going toward a line interface device at which trouble has happened so that the frame may be switched over to the spare line interface device $16_{N+1}$.

Here, how the ATM line control component operates when trouble has happened, for example, at the line interface device $16_N$ will be described. The tag control section 17 that is monitoring the state of each line interface device receives device trouble information and identifies the line interface device $16_N$ at which trouble has happened. Next, the tag control section 17 arranges the frame tag attaching section $13_N$ so that the frame tag attaching section $13_N$ may add a routing header to an SDH or SONET frame coming in from the ATM line $12_N$ and give tag information indicating the spare line interface device $16_{N+1}$ in the added routing header. Based on this arrangement, the frame switching section 14 switches the frame from the line interface device $16_N$ for current use to the spare line interface device $16_{N+1}$.

The tag control section 17 also arranges the frame tag attaching section $15_N$ so that the flame tag attaching section $15_N$ may attach tag information indicating the ATM line $12_N$ to a frame coming from the spare line interface device $16_{N+1}$. Thus, when trouble has happened at one of the line interface devices $16_1$~$16_N$ for current use, the ATM line $12_N$ is connected with the spare line interface device $16_{N+1}$, so that the service can be continued without interruption.

Thus, when trouble has happened, a line interface device to which an SDH frame should go can be chosen only by changing a tag of the SDH frame. On the other hand, a frame coming from the spare line interface device can be made to flow to a line appointed for that frame.

When trouble has happened at any of the line interface devices $16_1$~$16_N$, cells that are to come from the ATM concentrator 18 to the line interface device at which trouble has happened need to be arranged to go into the spare line interface device $16_{N+1}$. How such cells are made to flow to the spare system will be described below.

Figure 3:
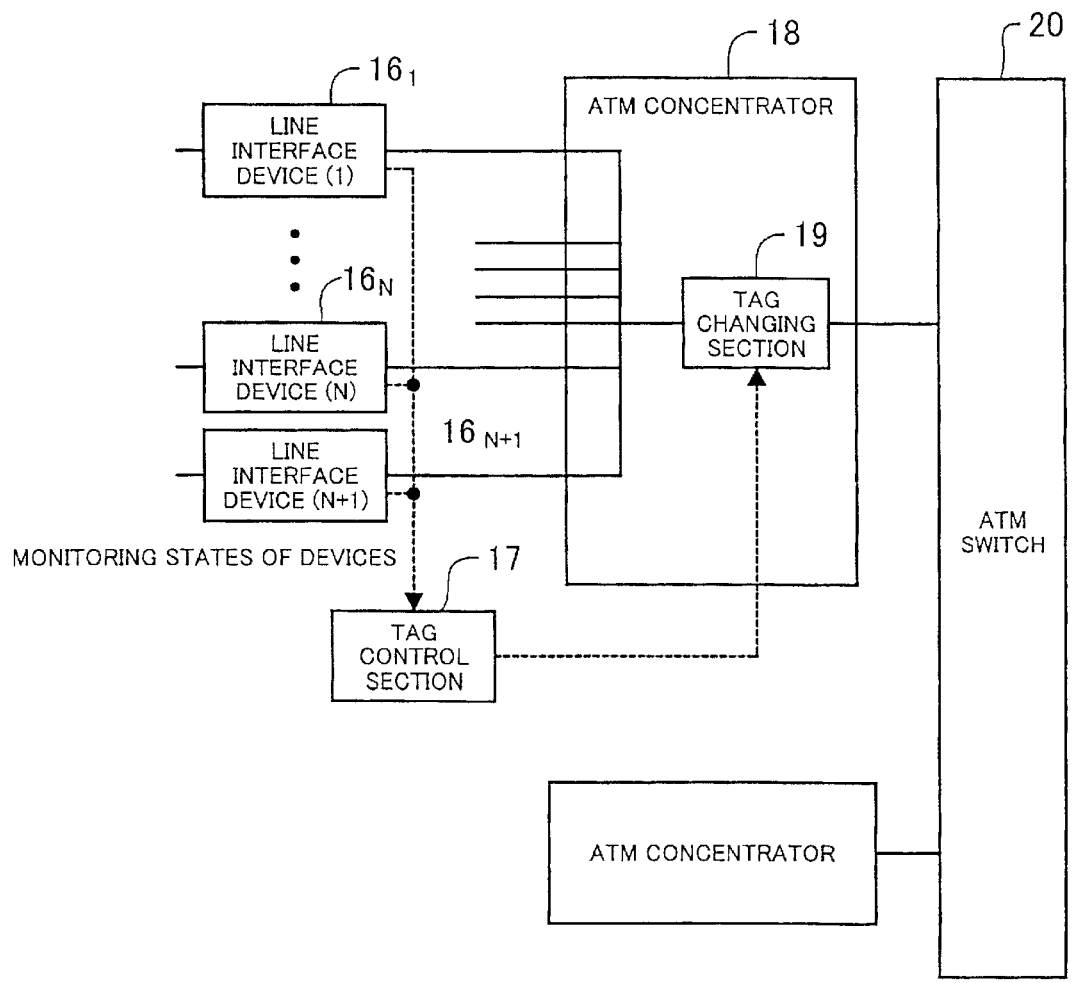
FIG. 3 is a diagram showing a structure of an ATM concentrator.

FIG. 3 is a diagram showing a structure of an ATM concentrator. In the ATM concentrator 18, a tag changing section 19 is provided. The ATM concentrator 18 is between an ATM switch 20 and line interface devices, and has a function of checking tag information given in each cell that is coming from the switch toward a line interface device, and delivering each cell to its appointed line interface device. In accordance with instructions from the tag control section 17, the tag changing section 19 changes a tag of a cell coming from the ATM switch 20, if the tag has a particular value, to another particular value so that the cell may be routed not to an originally appointed line interface device but to the spare line interface device.

Here, when trouble happens at a certain line interface device, a tag of a cell that is to go to the line interface device at which trouble has happened is changed to a value indicating the spare line interface device $16_{N+1}$. For example, if a physical number "1" is assigned to the line interface device $16_1$ and a physical number "N+1" is assigned to the spare line interface device $16_{N+1}$, cells having a tag of a value "1" each goes into the line interface device $16_1$. If trouble happens at the line interface device $16_1$, the tag changing section 19 changes a tag of a cell that has come into the ATM concentrator to a value "N+1", if the cell has a tag of a value "1". Thus, among cells that are flowing from the ATM switch 20 toward the ATM lines, cells that are to flow into the line interface device $16_1$ are arranged to flow into the spare line interface device $16_{N+1}$.

Thus, the destination of cells that are flowing toward the line corresponding section can be switched by sending tag changing instructions to the ATM concentrator that holds the line interface device at which trouble has happened, only once, instead of changing paths for those cells with devices located on the opposite side of the ATM switch.

As described above, a frame or a cell coming from an ATM line or the ATM concentrator 18 is switched from a line interface device $16_1$~$16_N$ for current use to the spare line interface device $16_{N+1}$, only by attaching or changing tag information. Therefore, other information such as path data remains unchanged. Next, the case where such information is replaced will be described.

Figure 4:
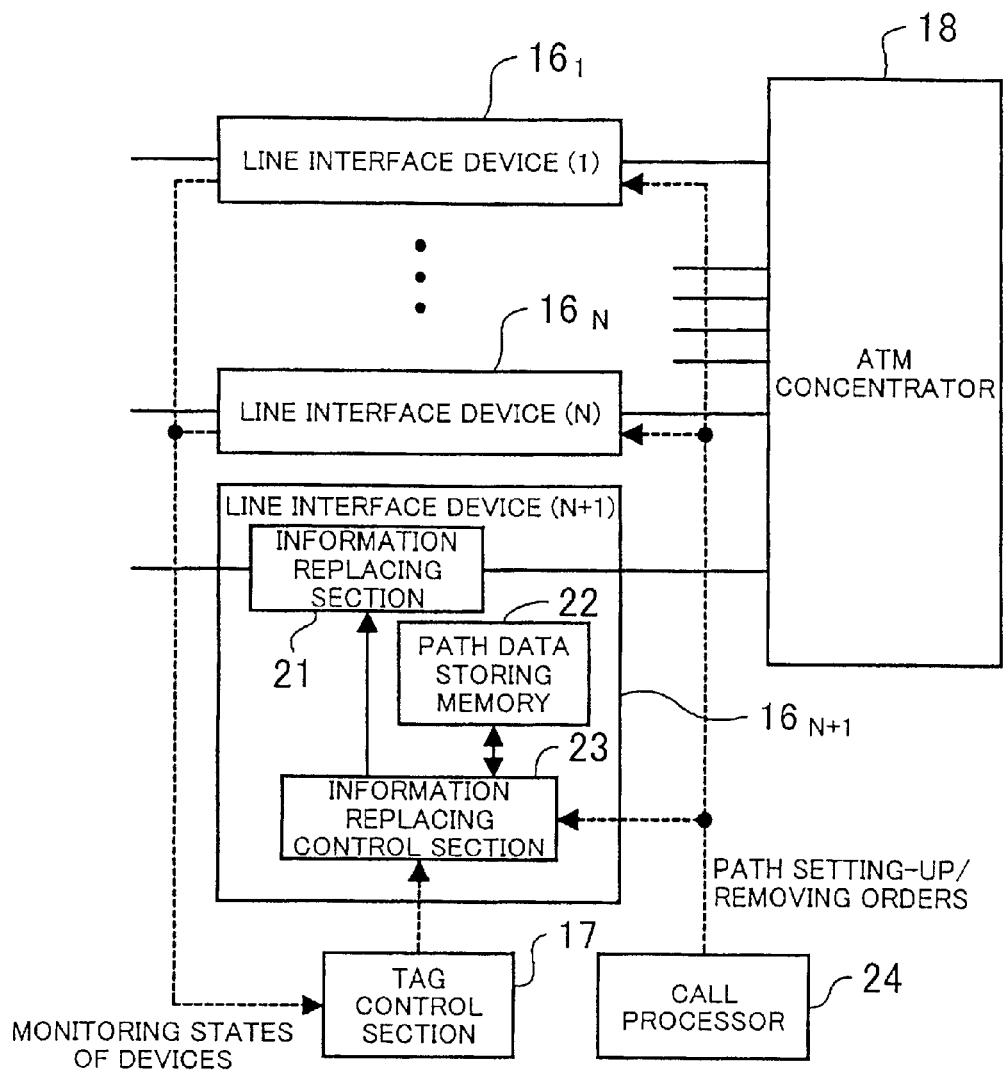
FIG. 4 is a diagram showing an example of structure of a spare line interface device having an information replacing function.

FIG. 4 is a diagram showing an example of structure of a spare line interface device having an information replacing function. According to this example, a spare line interface device $16_{N+1}$ has a structure different from the structure of the line interface device $16_1$~$16_N$ for current use. Specifically, the spare line interface device $16_{N+1}$ has an information replacing section 21, path data storing memory 22 and an information replacing control section 23 for controlling the sections 21 and 22. The information replacing control section 23 is connected with a tag control section 17 and a call processor 24.

In the information replacing section 21, a preset value of cell flow for use in a UPC (Usage Parameter Control) for monitoring the amount of cells flowing in, and a header replacing operation for replacing information placed in a header of a cell on a connection basis are registered. When the spare line interface device $16_{N+1}$ is not in use, the information replacing section 21 is in an initialized state. The path data storing memory 22 holds UPC data for the line interface devices $16_1$~$16_N$ for current use and header replacing data, in advance.

The call processor 24 puts out path setting-up/removing orders and makes control so that the data stored in the path data storing memory 22 may always conform to data for the line interface devices $16_1$~$16_N$ for current use.

In normal operation, when the call processor 24 puts out path setting-up orders for an SVC (switched virtual connection), a PCV (permanent virtual connection) or the like, a path is set up, for example, at the line interface device $16_1$. At the same time, the call processor 24 delivers path data about the set-up path to the spare line interface device $16_{N+1}$. The information replacing control section 23 places the delivered path data in an area for data for the line interface device $16_1$ in the path data storing memory 22. Thus, the path data for the line interface devices $16_1$~$16_N$ for current use is stored in the path data storing memory 22 in the spare line interface device $16_{N+1}$.

Here, for example, trouble happens at the line interface device $16_1$. The tag control section 17 that is monitoring the state of each line interface device detects the line interface device at which trouble has happened, and informs the information replacing control section 23. The information replacing control section 23 reads the data for the line interface device $16_1$ at which trouble has happened from the path data storing memory 22 and places it in the information replacing section 21. This means that the information in the information replacing section 21 is, at this time, replaced by the information for the line interface device $16_1$ at which trouble has happened.

Thus, the path data in the spare line interface device can be replaced by the path data for the line interface device at which trouble has happened, quickly.

Figure 5:
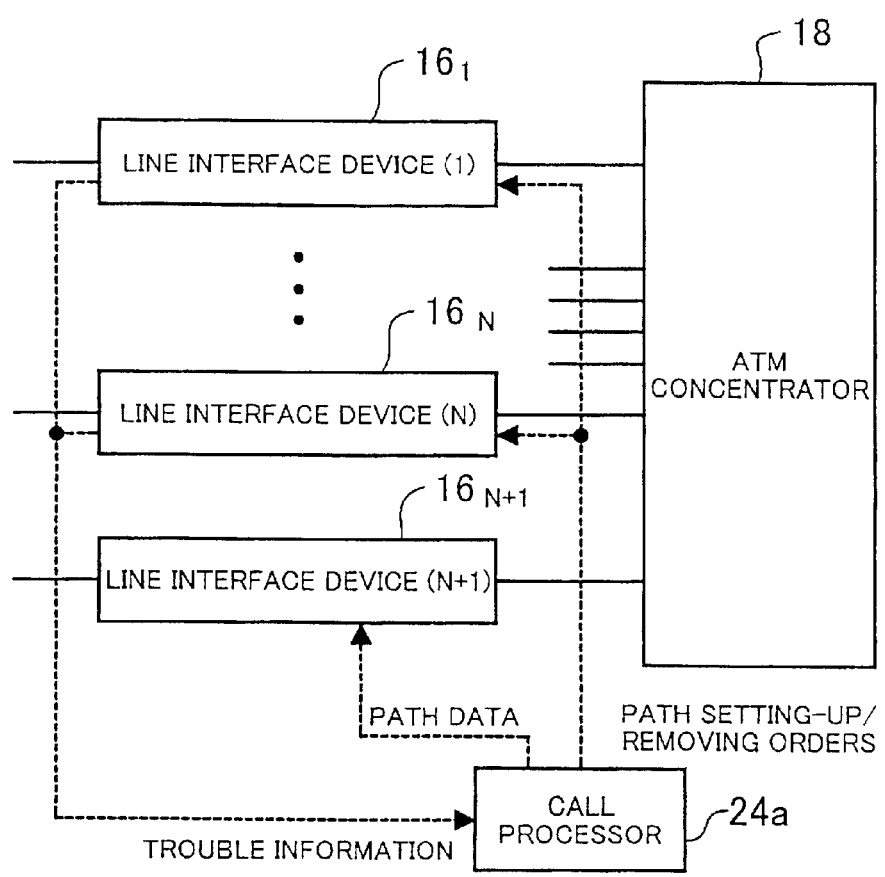
FIG. 5 shows another example of structure for replacing information.

FIG. 5 shows another example of structure for replacing information. In this example, a call processor 24a has part or all of the functions of the information replacing section 21, path data storing memory 22 and information replacing control section 23 of the example shown in FIG. 4.

The call processor 24a holds all the path data about connections of the line interface devices $16_1$~$16_N$ for current use. Therefore, when trouble happens at any of the line interface devices $16_1$~$16_N$ for current use, the call processor can send out the path data about the line interface device at which trouble has happened to the spare line interface device $16_{N+1}$ to make the path data in the spare line interface device $16_{N+1}$ conform to the path data for the line interface device at which trouble has happened. Thus, the spare line interface device $16_{N+1}$ can obtain the required path data quickly.

Unlike the structure of FIG. 4, the structure of FIG. 5 does not need a spare line interface device $16_{N+1}$ having a special structure, therefore, does not cost much. Further, the structure of FIG. 5 does not need to have a path data storing memory whose size is in proportion to the number of line interface devices. Thus, the structure of FIG. 5 is advantageous, physically as well as in view of cost.

Next, a redundant structure control device for a structure in which line interface devices are only those for current use but a spare ATM line is provided will be described.

Figure 6:
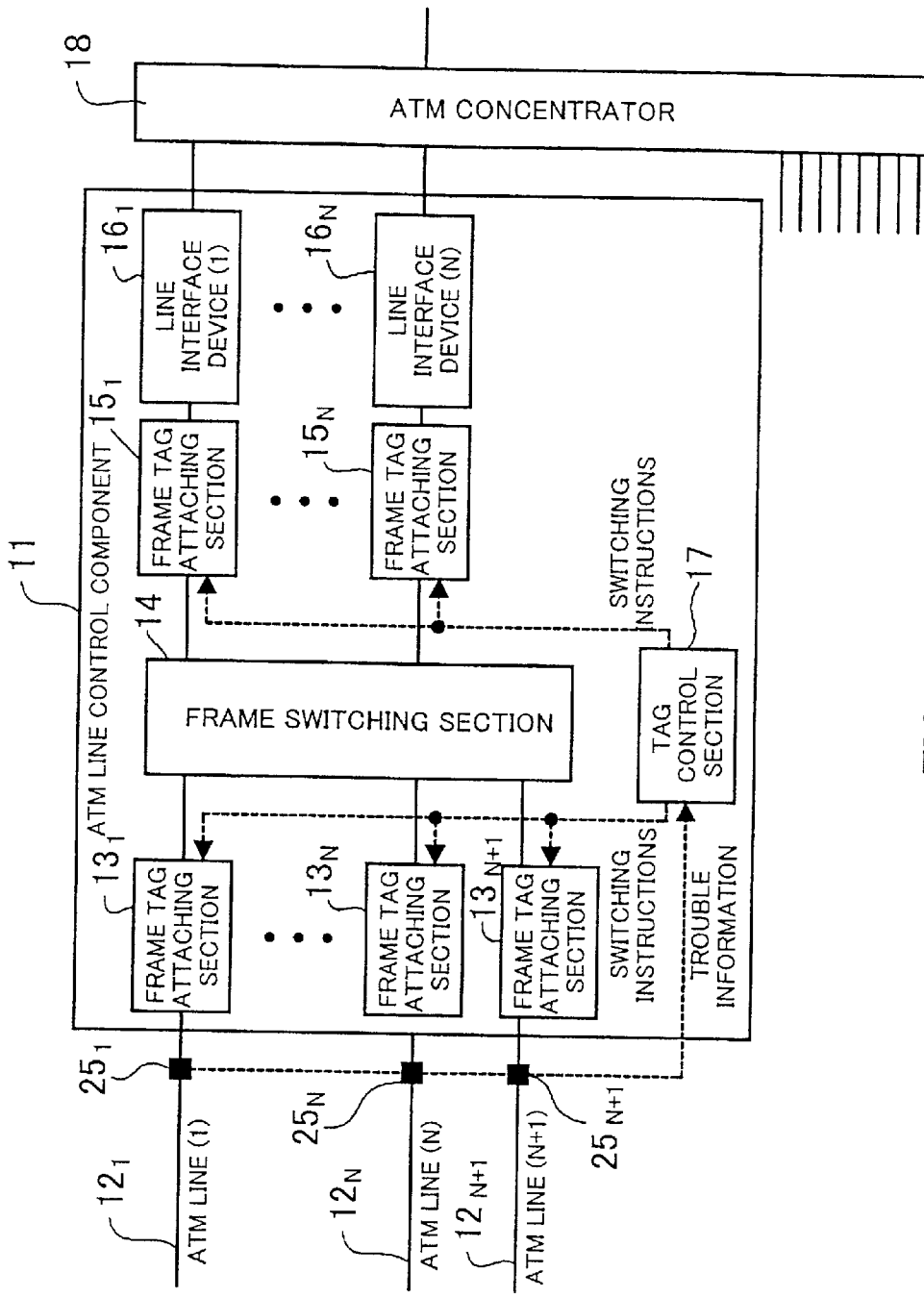
FIG. 6 is a diagram showing an example of structure of an ATM line control component having a spare ATM line.

FIG. 6 is a diagram showing an example of structure of an ATM line control component having a spare ATM line. FIG. 6 shows a structure of an ATM line control component 11 having (N+1) lines and N line interface devices. The ATM line control component 11 includes a frame tag attaching section $13_{N+1}$ that terminates a spare ATM line $12_{N+1}$. Each ATM line $12_1$~$12_{N+1}$ is provided with a line trouble monitoring section $25_1$~$25_{N+1}$ for monitoring trouble happening at a line.

When any of the line trouble monitoring sections $25_1$~$25_N$ detects trouble happening at a line, trouble information about that trouble is delivered to the tag control section 17.

For example, when trouble happens at the ATM line $12_N$, the tag control section 17 sends out switching instructions to the frame tag attaching section $13_{N+1}$ so that a frame coming from the ATM line $12_{N+1}$ may be sent to the line interface device $16_N$.

Further, the tag control section 17 sends out switching instructions to the frame tag attaching section $15_N$ so that a frame coming from the line interface device $16_N$ may flow to the ATM line $12_{N+1}$.

Figure 7:
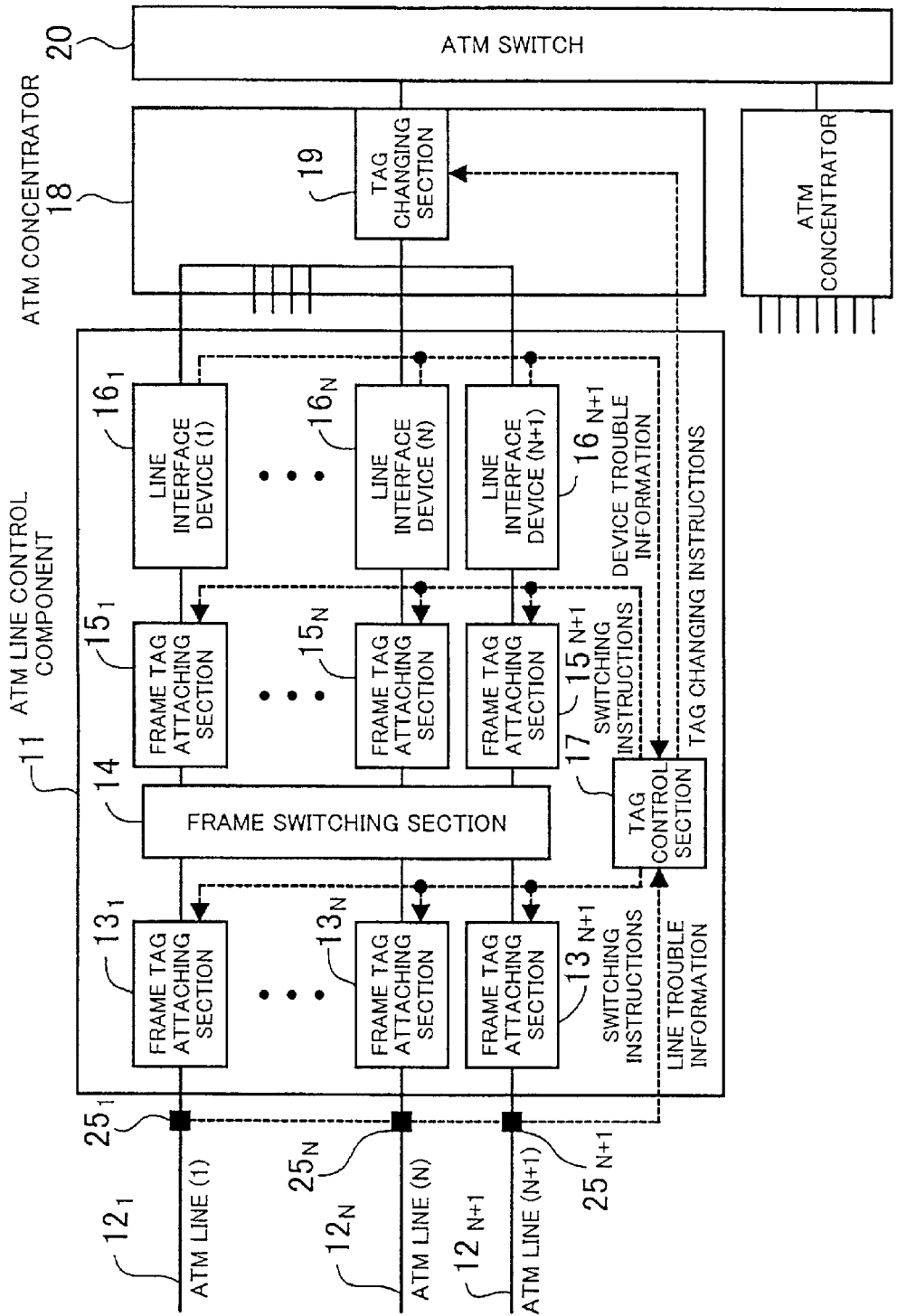
FIG. 7 is a diagram showing an example of structure comprising an ATM line control component and an ATM concentrator having a spare ATM line and a spare line interface device.

FIG. 7 is a diagram showing an example of structure comprising an ATM line control component and an ATM concentrator having a spare ATM line and a spare line interface device. The structure of this example is like the structures of FIGS. 2, 3 and 6 combined together. Therefore, elements corresponding to those shown in FIGS. 2, 3 and 6 will be denoted by the same reference numbers and the detailed explanation thereof will be omitted.

With this structure, the tag control section 17 conducts, when trouble happens at any of the ATM lines $12_1$~$12_N$, switching to the ATM line $12_{N+1}$, and when trouble happens at any of the line interface devices $16_1$~$16_N$, switching to the line interface device $16_{N+1}$.

Therefore, when trouble happens at any line or any line interface device, switching is not performed to both the spare line and the spare line interface device at a time. Therefore, when trouble happens at both a line and a line interface device, doubly, switching to the spare line and switching to the spare line interface device are performed separately, so that the line service can be continued without interruption.

Figure 8:
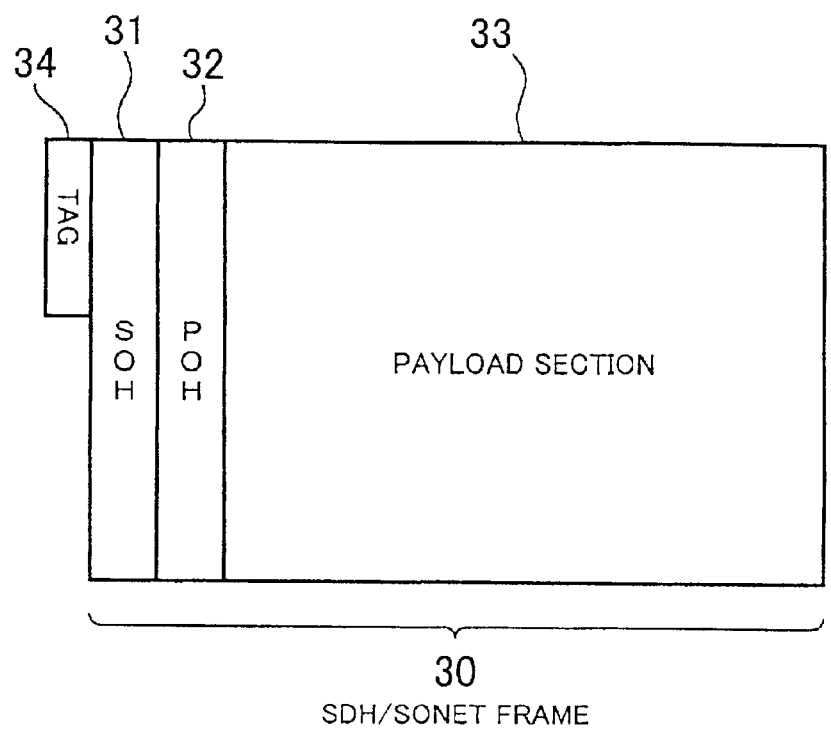
FIG. 8 shows a data form of a frame used at a frame tag attaching section and a frame switching section.

FIG. 8 shows a data form of a frame used at a frame tag attaching section and a frame switching section. An SDH/SONET frame 30 flowing though an ATM line consists of a section overhead (SOH) 31, a path overhead (POH) 32 and a payload section 33. The payload section 33 contains a plurality of cells.

In the SDH/SONET frame 30, there is no room to put in tag information used at the frame switching section 14. Therefore, a tag given by the frame tag attaching sections $13_1$~$13_{N+1}$ and $15_1$~$15_{N+1}$ is additionally attached at the head of the SDH/SONET frame 30. The tag 34 consists of bits enough to represent line 1 to line (N+1), that is, all the lines for current use and the spare line.

Next, how the ATM line control component 11 and the ATM concentrator 18 operate will be described taking an example in which trouble happens doubly and switching to the spare system is performed.

Figure 9:
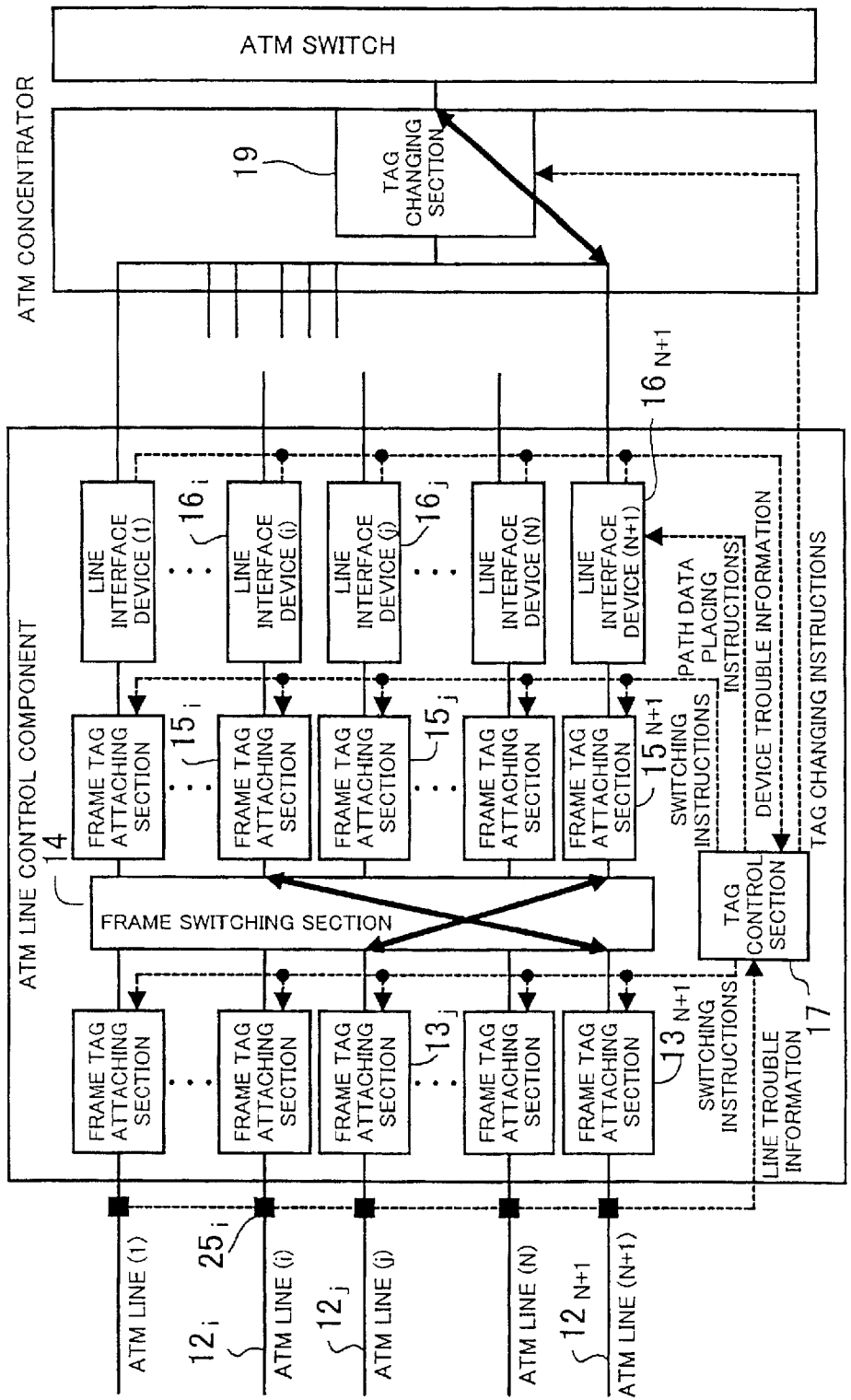
FIG. 9 is a diagram for explaining how switching is performed when trouble has happened.

FIG. 9 is a diagram for explaining how switching is performed when trouble has happened. Here, an example in which trouble happens first at an (i)th ATM line $12_i$, and then happens at a (j)th line interface device $16_j$ will be taken.

First, when a line trouble monitoring section $25_i$ puts out line trouble information, a tag control section 17 sends out switching instructions to frame tag attaching sections $13_{N+1}$ and $15_i$. Specifically, the tag control section 17 instructs the frame tag attaching section $13_{N+1}$ to attach a tag "i" to a frame coming in from an ATM line $12_{N+1}$, and instructs the frame tag attaching section $15_i$ to attach a tag "N+1" to a frame coming in from a line interface device $16_i$. With this, a frame switching section 14 switches a frame coming in from the ATM line $12_{N+1}$ over to the line interface device $16_i$, and switches a frame coming in from the line interface device $16_i$ over to the ATM line $12_{N+1}$, as indicated by solid-line arrows. At this stage, the line interface device $16_i$ operates normally. Therefore, trouble treatment ends.

Next, when a line interface device $16_j$ puts out device trouble information, the tag control section 17 sends out tag changing instructions to a tag changing section 19 so that the tag changing section 19 may change a tag "j" of a cell to "N+1". The tag control section 17 also sends out path-data placing instructions to a line interface device $16_{N+1}$ so that path data for the line interface device $16_j$ may be read from a path data storing memory and placed in an information replacing section. The tag control section 17 further instructs a frame tag attaching section $15_{N+1}$ to attach a tag "j" to a frame coming in from the line interface device $16_{N+1}$, and instructs a frame tag attaching section $13_j$ to attach a tag "N+1" to a frame coming in from an ATM line $12_j$.

Thus, a frame coming in from the ATM line $12_j$ is switched by the frame switching section 14 over to the frame tag attaching section $15_{N+1}$ and goes into the line interface device $16_{N+1}$. On the other hand, a tag of a cell coming from an ATM switch 20 toward a line interface device $16_j$ is changed by the tag changing section 19, so that the cell goes into the line interface device $16_{N+1}$. In the line interface device $16_{N+1}$, path data for the line interface device $16_j$ has been already placed. Therefore, the line interface device $16_{N+1}$ is already prepared to substitute for the line interface device $16_j$. Thus, the line interface device $16_{N+1}$ operates in the same way as the line interface device $16_j$. Next, a frame coming from the line interface device $16_{N+1}$ and through the frame tag attaching section $15_{N+1}$ is switched by the frame switching section 14 over to the frame tag attaching section $15_j$ and goes to the ATM line $12_j$. Thus, even when trouble happens doubly, the service can be continued.

As described above, in the present invention, a frame switching section is provided between lines and line interface devices, and before a frame comes into the frame switching section, a tag indicating the destination of the frame is attached to the frame. Switching from a system for current use to a spare system is performed on an SDH frame basis. Therefore, necessary switching can be performed simply with simple hardware. Further, switching to a spare line and switching to a spare line interface device can be performed separately. Therefore, if trouble happens doubly, the service can be continued without interruption.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A redundant structure control device for use with an exchange having a Asynchronous Transfer Mode (ATM) switch, an ATM concentrator, a plurality (N+1) of line interface devices to interface with a plurality (N+1) of ATM lines, the (N+1)th line interface device being a spare line interface device, the (N+1th) ATM line being a spare ATM line the redundant structure control device comprising:

frame tag attaching means, disposed between the ATM lines and the line interface devices, for attaching a routing header containing tag information to each frame coming from the ATM lines or line interface devices;

frame switching means, coupled to said frame tag attaching means, for switching frames between the ATM lines and the line interface devices in accordance with said tag information given to each frame;

tag changing means, disposed in the ATM concentrator, for changing tag values of ATM cells sent from the ATM switch, the tag values indicating to which line interface devices the ATM cells are addressed; and routing control means for setting up said frame tag attaching means and said tag changing means;

wherein, in response to troubles with the I-th ATM line and with the j-th line interface device where neither (nor j is equal to (N+1), said routing control means sets up said frame tag attaching means and tag changing means such that;

frames coming from and going to the (N+1)th ATM line be supplied to and from the j-th line interface device, frames coming from and going to the j-th ATM line be supplied to and from the (N+1)th line interface device, and ATM cells addressed from the ATM switch to the j-th line interface device be redirected to the (N+1)th line interface device.

2. The redundant structure control device according to claim 1, further comprising;

memory means, disposed in the (N-+1)th line interface devices, for storing path information for all the line interface devices for current use, and path-information placing means, disposed in the (N+1)th line interface device, for reading path information for the failed j-th line interface device from said memory means and placing said path information, to the (N+1)th line interface device, in accordance with instructions from said routing control means.

3. The redundant structure controls device according to claim 1, wherein:

the (N+1)th line interface device has the same structure as the other line interface devices have, and path information for the failed j-th line interface device is transferred to the (N+1)th line interface device by a call processor disposed in the exchange.

* * * * *